United States Patent [19]
Taguchi et al.

[11] Patent Number: 4,848,606
[45] Date of Patent: Jul. 18, 1989

[54] APPARATUS FOR DISPENSING A PREDETERMINED VOLUME OF PASTE-LIKE FLUID

[75] Inventors: Katsuhiko Taguchi; Yoshimi Imamiya; Yuji Takegawa; Kiyoshi Kuroda; Sotonari Arashi, all of Chofu, Japan

[73] Assignee: Tokyo Juki Industrial Co., Ltd., Tokyo, Japan

[21] Appl. No.: 76,707

[22] Filed: Jul. 23, 1987

[30] Foreign Application Priority Data

Jul. 31, 1986 [JP] Japan .................................. 61-181599
Jun. 30, 1987 [JP] Japan .................................. 62-163289

[51] Int. Cl.⁴ ............................................. B05C 3/02
[52] U.S. Cl. .................................... 222/333; 118/410; 141/284; 222/390
[58] Field of Search ....................... 118/323, 410, 411; 141/284; 222/320, 333, 387, 390, 526, 537; 74/640

[56] References Cited

U.S. PATENT DOCUMENTS

| | | | |
|---|---|---|---|
| 1,083,887 | 1/1914 | Matthews | 222/326 |
| 2,715,991 | 8/1955 | Frank et al. | 222/390 X |
| 2,946,486 | 7/1960 | Gilmont | 222/390 X |
| 4,096,972 | 6/1978 | Bartels et al. | 222/135 |
| 4,235,556 | 11/1980 | Dewey et al. | 74/640 X |
| 4,485,387 | 11/1984 | Drumheller | 346/140 R |
| 4,573,566 | 3/1986 | Roman | 74/89.15 X |
| 4,622,239 | 11/1986 | Schoenthaler et al. | 118/410 X |

Primary Examiner—Michael S. Huppert
Attorney, Agent, or Firm—Morgan & Finnegan

[57] ABSTRACT

A piston driving device for dispensing a predetermined small amount of paste-like material from a nozzle in response to an electrical signal without any time-delay is enabled by the slow rotation of a ball-screw shaft, the rotation being reduced by a differential gear system. A female ball-nut fitted onto the ball-screw shaft causes a piston plunger to advance at very low speed such that dispensing of the predetermined volume of paste-like fluid is possible. Vertical motion of a nozzle is compensated by vertical motion of a piston driving device such that the relative position of a piston against a nozzle is unchanged.

9 Claims, 6 Drawing Sheets

APPARATUS FOR DISPENSING A PREDETERMINED VOLUME OF PASTE-LIKE FLUID

BACKGROUND OF THE INVENTION

The invention relates to an apparatus for dispensing small amounts of paste-like fluid from a nozzle. The invention relates more particularly to an apparatus for dispensing a predetermined volume of paste-like fluid accurately and controllably.

When forming a thick film integrated circuit on an aluminium substrate or on a heat-resisting ceramic substrate, at first the electrically conductive paste is applied by a screen process and is then fired at a high temperature, and as a next step, the resistive paste is applied by a screen process and fired at a high temperature. Such a way of manufacturing an IC(integrated circuit) hybrid is well-known. Such a conventional way of producing IC hybrids is feasible for mass-production, but a screen pattern has to be made whenever a circuit pattern is changed, and in some cases, the size of the substrate has to be changed. Accordingly, the conventional way is not feasible when producing runs of small quantities of specialty circuits. In addition, it takes a considerable amount of time to run the prototype and would cause delivery delays.

Recently, dispensing in response to a programmed computer control has been suggested. According to this suggestion, the paste is dispensed from the nozzle in response to the designed circuit information, such that the circuit is plotted directly and freely and runs of small quantities become feasible. But according to the suggestion, since the viscosity-temperature chart of the paste shows an exponential-function relation and the dispensed volume is influenced in response to the air pressure and the passage friction therein, it is very difficult to dispense the predetermined small amount of paste although air pressure is always kept constant. Further, there exists some time-delay between the air signal and the dispensed volume, and it is hard to control this timing.

SUMMARY OF THE INVENTION

Hence with the foregoing in mind, it is a primary object of the present invention to provide an apparatus for dispensing a predetermined volume of paste accurately, regardless of its viscosity, nozzle configuration, etc.

It is a further object to reduce the weight of the piston driving device such that vertical motion of the nozzle is quickened and the productivity of IC hybrids is increased.

Yet another object is to provide a maintenance-free apparatus for dispensing the predetermined volume of paste-like fluid.

In order to implement these and other objects of the invention, which will become apparent as the description proceeds, the invention comprises an apparatus for dispensing a predetermined volume of paste including a nozzle-holder wherein a piston and a nozzle are united, a nozzle-piston driving device which drives said piston by a differential motor, and a vertical driving device for said nozzle-holder.

BRIEF DESCRIPTION OF THE DRAWINGS

For a fuller understanding of the nature and objects of the invention, reference should be had to the following detailed description, taken in connection with the accompanying drawings in which.

DESCRIPTION OF THE PRIOR ART

Figure 1:
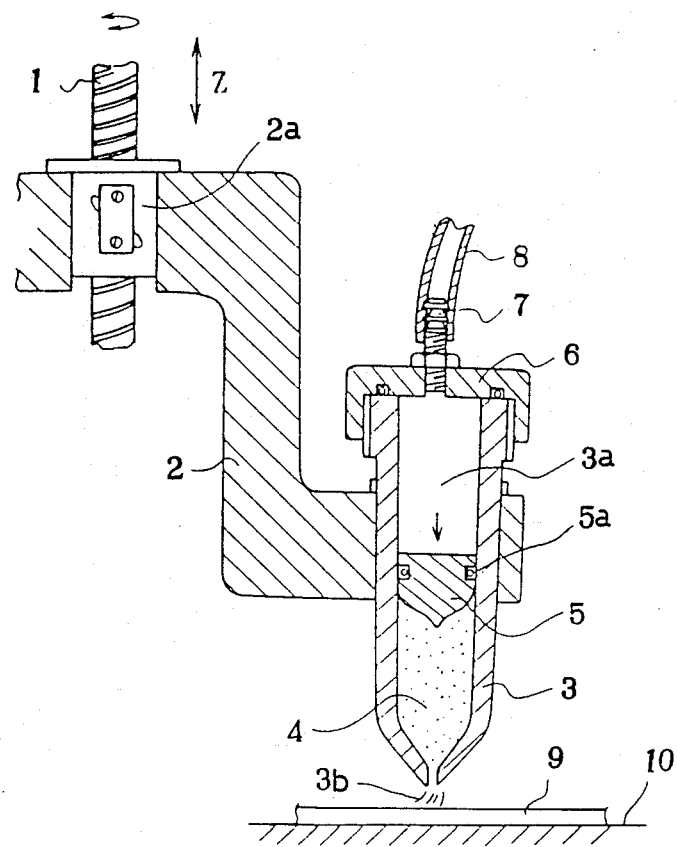
FIG. 1 is a sectional side elevation of a conventional apparatus for dispensing a predetermined volume of paste-like fluid.

Referring now to FIG. 1 of the drawings, a sectional side elevation of a conventional apparatus for dispensing the predetermined volume of paste-like fluid is shown. A ball-screw shaft is connected to a motor (not shown). A ball-nut 2a is fitted to the ball-screw shaft 1 and a nozzle-holder 2 is fixed to the ball-nut 2a. A nozzle 3 is attached to the nozzle-holder 2. Paste 4 is loaded in the nozzle 3. A float 5 is placed on the upper surface of paste 4.

An O-ring 5a is inserted between the float 5 and the inner wall of the nozzle 3 such that the float 5 works as a piston to push out the paste 4. A cap 6 cover the upper spout of the nozzle 3. A flexible hose 8 is connected in the upper empty space 3a of the nozzle 3 via a connector 7, and air is supplied through the flexible hose 8 to the empty space 3a. A substrate 9 is placed on a table 10, and the table 10 is moved by an X-Y driver (not shown) which is controlled by programs. Thus, the nozzle 3 is moved vertically by rotating the ball-screw shaft 1. Air supplied through the flexible hose 8 pushes the float 5, and accordingly, a small amount of the paste 4 is dispensed from a spout 3b to the substrate 9.

The table 10 moves the substrate 9 in the direction of the X-Y driver and thus the thick film integrated circuit is formed on the substrate 9. However, according to this conventional way, it is very difficult to dispenses a predetermined volume of paste accurately, since there are many functions which control the dispensation of volumes of paste, i.e., the viscosity which varies exponentially with regard to temperature, air pressure, air pressure loss due to the passage friction, the configuration of the nozzle spout, etc. Therefore, controlling the dispensation of volume by air pressure is very difficult. Further, there exists some time-lag between the air signal and the dispensing action, and this timing control is highly problematic.

DESCRIPTION OF THE PREFERRED EMBODIMENTS

Figure 2:
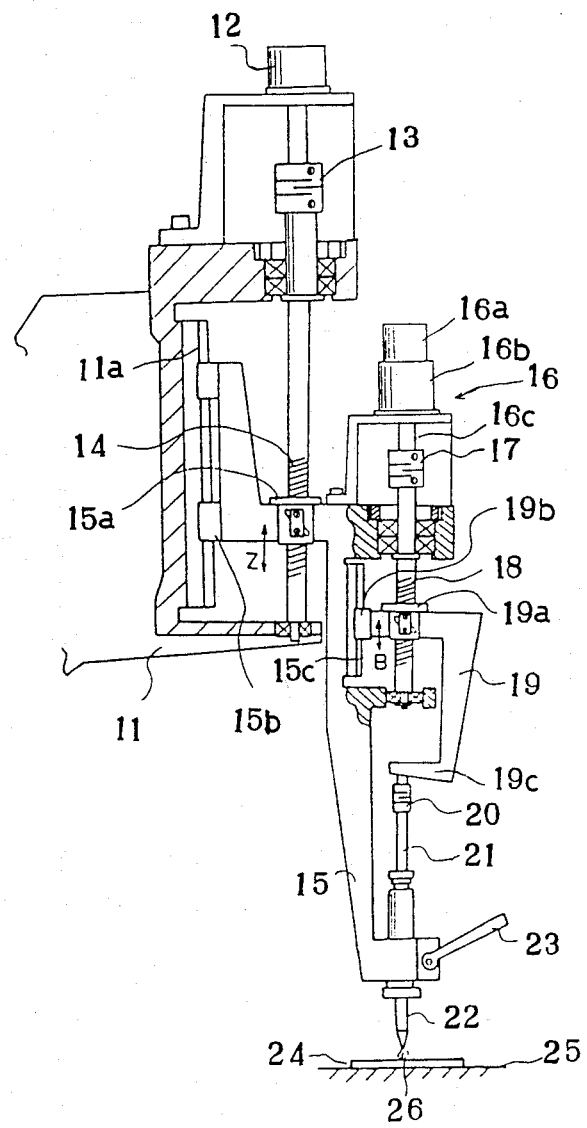
FIG. 2 is a sectional side elevation of an apparatus for dispensing the predetermined volume of paste-like fluid according to an embodiment of the present invention.

Referring to FIG. 2, a sectional side elevation of an apparatus for dispensing a predetermined volume of paste-like fluid according to this invention is shown. A motor 12 which moves a nozzle vertically is attached to a frame 11. A coupling 13 is connected to a shaft of motor 12, and a ball-screw shaft 14 is connected to the coupling 13. A ball-nut 15a attached to a nozzle holder 15 is fitted onto the ball-screw shaft 14. A guide holder 15b of the nozzle-holder 15 fits on a guide 11a such that the nozzle holder 15 moves vertically along the guide 11.

A piston driving device 16, comprising a piston-drive motor 16a and a differential gear 16b are attached to the nozzle holder 15. A drive shaft 16c of the piston drive motor 16a connects a ball screw 18 by means of a coupling 17. A ball-nut 19a attached to a piston driving device 19 is fitted onto the ball-screw shaft 18. A guide 19b attached to the piston driving device 19 is fitted on a guide 15c such that the piston driving device 19 moves vertically along the guide 15c. A pressing portion 19c of the lower part of the piston driving device 19 engages a piston plunger 21 of a nozzle 22 by means of a flexible coupling 20. A lever 23 firmly secures the nozzle 22 to the nozzle-holder 15. The nozzle 22 is easily replaced by releasing the lever 23.

A substrate 24 is placed on a table 25 which is moved in the X-Y direction by an X-Y driver (not shown). When the motor 12 rotates, the ball-screw 14 rotates via the coupling 13, and accordingly the nozzle-holder moves in the direction shown by the arrow "Z". When the piston drive monitor 16a rotates, the drive shaft 16c rotates the ball-screw 18 via the coupling 17, and accordingly, the piston driving device 19 moves in the direction of arrow "B", and presses the piston 21 via the flexible coupling 20. Thus, paste 26 loaded in the nozzle 22 is dispensed through the nozzle 22. By applying the differential gear 16b to the piston driving motor 16a (stepping motor or DC motor), the piston driving device can dispense a small amount of paste on a case by case basis.

Figure 3:
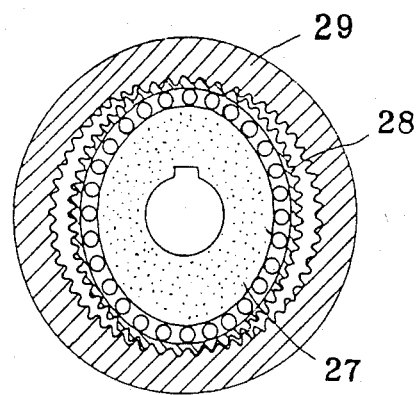
FIG. 3 shows a differential gear drive of the present invention.

Referring to FIG. 3, the differential gear 16b comprises a wave-generator 27, a flex-spline 28, and a circular-spline 29. Such a differential gear is called a "HARMONIC DRIVE". When the wave-generator 27 rotates, the periphery portion of the flex spline 28 is deformed elastically and the point where gear-smashing occurs with the teeth of the circular-spline 29 moves incrementally. When the wave-generator 27 completes one clockwise rotation, the flex-spline 28 is rotated counter-clockwise, and its rotation is equivalent to the difference in the number of teeth between the flex-spline 28 and the circular spline 29.

If the number of teeth at the flex-spline 28 is two less than the number of teeth at the circular-spline 29, the flex-spline 28 is rotated in a direction opposite to the rotational direction of the wave generator 27 and its rotation is equivalent to two teeth pitches of the circular spline 29. Thus, this type of gear differential device, e.g. "HARMONIC DRIVE", is effective for obtaining a high speed reduction ratio (normally 1/80–1/320), is very accurately made, and is light. As a result, the weight of the piston-driving device 16 is kept within approximately 300 grams, so vertical motion of the nozzle 22 is sped up and results in a higher production.

When a five-phase stepping motor is combined with a 4 mm pitch ball-screw shaft, the piston displacement of 0.02 m/pulse is obtained. Since a five-phase stepping motor advances 0.18 degrees per 100 pulses, piston displacement will be as follows, if the pitch of ball-screw is 4 mm:

$$4\,\text{mm} \times (0.18/360) = 0.002 \text{ mm per 100 pulses} = 0.02\ \mu\text{m per pulse}$$

If the DC servo motor is applied, approximately the same displacement per pulse will be obtained.

Figure 4:
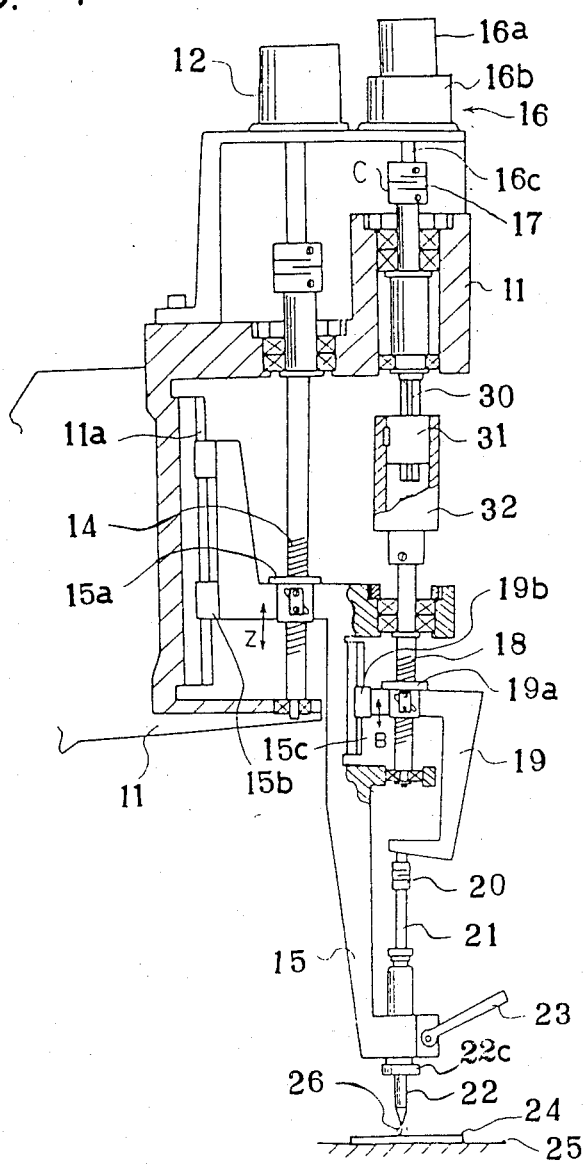
FIG. 4 is a sectional side elevation view according to another embodiment of the present invention.

FIG. 4 shows another embodiment of the invention. The piston-driving device 16 is placed on a frame 11, and a motor shaft 16 is connected to a spline shaft 30 via a coupling 17, and the spline shaft 30 is rotatably sustained by the frame 11 with bearings therein. The ball-screw shaft 18 fixes a tubular-part 32 in which a female spline part 31 is inserted and is fixed by a key.

Accordingly, when the spline shaft 30 rotates, the ball-screw shaft 18 rotates, and when the ball-screw shaft 18 is raised as the nozzle-holder is raised by rotation of the ball-screw shaft 14, the tubular-part 32 slides up along the spline shaft 30. The ball-screw shaft 18 is rotated by the spline shaft 30 while the ball-screw shaft 18 slides vertically along the spline shaft 30. Thus, the rotational motion of the piston-driving device 16 causes the piston plunger 2 to move downward very slowly dispensing small amounts of the paste from the nozzle spout 26.

As explained above, the vertical motion of the nozzle-holder 15 by way of the motor 12, the ball-screw shaft 14, the ball-nut 15 is compensated (absorbed), thereby the position of the ball-screw shaft 18 in relation to the nozzle 22 is kept constant (unchanged). Accordingly, the total weight of the piston-driving device 16 will not be applied to the vertical motion of the nozzle 22.

Figure 5:
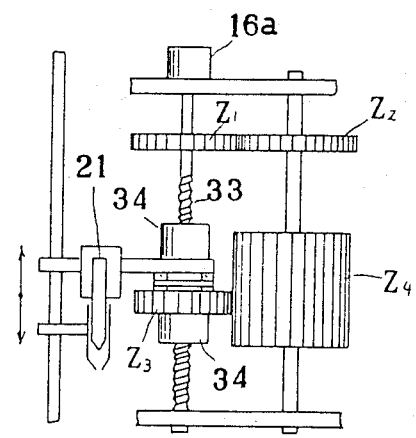
FIG. 5 is a side view of another embodiment of a differential gear system according to the present invention.

FIG. 5 shows another embodiment of the invention, especially with regard to the piston driving device 16 which comprises a motor 16a and a differential gear 16b.

Referring to FIG. 5, when the motor 16a rotates, a male screw shaft 33 rotates and causes a female-screw-body 34 to move vertically. The vertical motion of the female-screw-body 34 causes the piston 21 attached thereto also to move vertically as indicated by the arrows in FIG. 5. Simultaneously, the motor 16a transmits a rotational motion to the female-screw-body 34 through gears $Z_1$–$Z_2$–$Z_4$–$Z_3$. If the rotation of the female-screw-body 34 is very close to the rotation of the male-screw-shaft 33, the female-screw-body moves vertically with small displacement. If the pitch of the male-screw-shaft 33 is 3 mm, and the rotation ratio male-screw-shaft 33 to female-screw-body 34 is 0.99, the female-screw body 34 moves 0.03 mm per one rotation of male-screw-shaft 33, as the following formula shows:

$$3 \times (1 - 0.99) = 0.03 (\text{mm}) - \text{Displacement per one rotation of male-scale-shaft 33}$$

Figure 6:
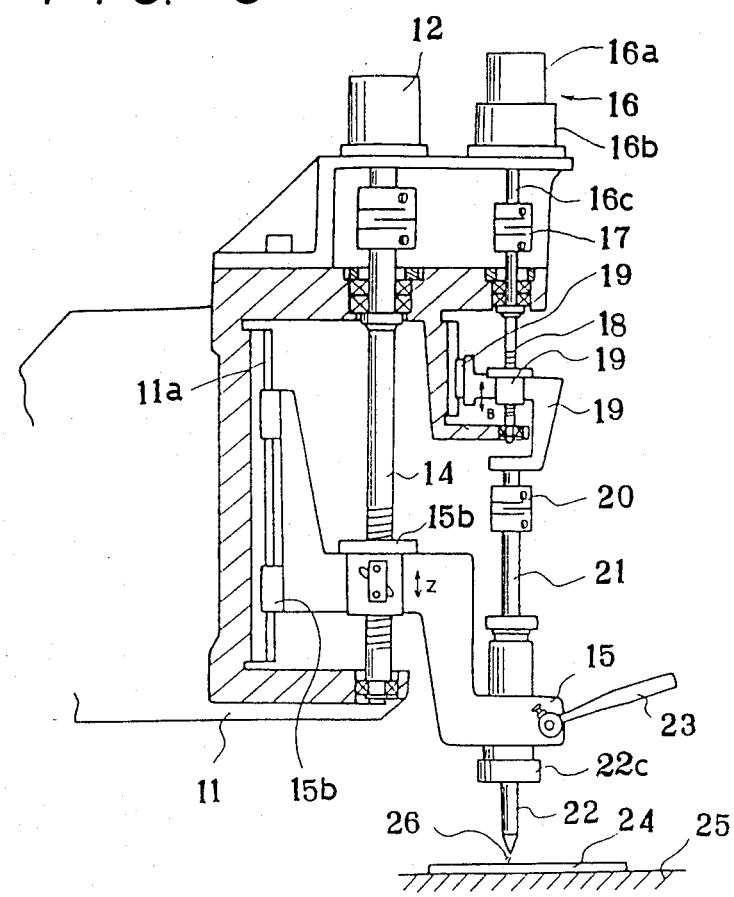
FIG. 6 is a side view of another embodiment of the present invention.

FIG. 6 shows another embodiment of the invention. A comparison of FIG. 6 with FIG. 4 shows that in FIG. 6 the spline shaft 30, the female spline part 31, and the tubular part 32 have been eliminated.

Referring to FIG. 6, the drive shaft 16c of the piston driving device 16 is connected to the ball-screw shaft 18 via the coupling 17. When the nozzle 22 is raised by rotation of the motor 12, the piston drive motor 16a rotates simultaneously such that the upward displacement of the nozzle 22 is compensated by the upward displacement of the piston driving device 19. Electrical circuits for the motor 12 and for the piston drive motor are synchronized to enable the above-mentioned compensating action. Such an electrical way of compensating the displacement by means of the motor 12a and the piston driving motor 16a eliminates mechanical parts associated with said compensating action.

Figure 7:
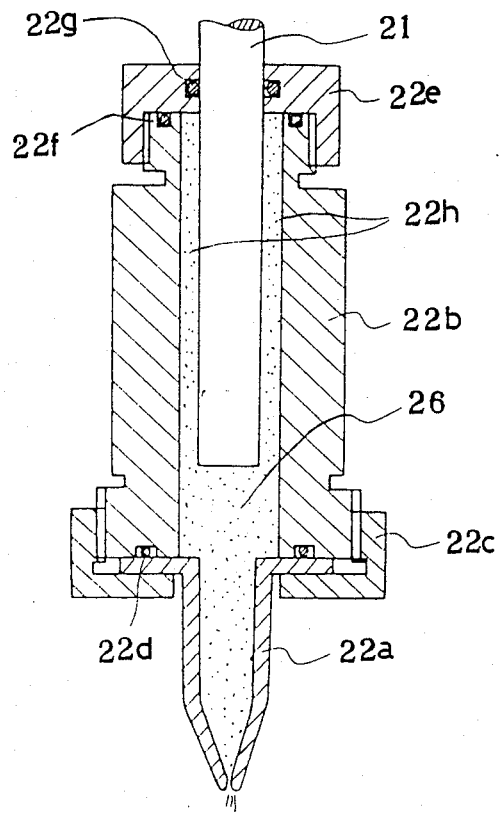
FIG. 7 is a sectional view of the nozzle body according to the present invention.

FIG. 7 shows a sectional view of the nozzle 22. A nozzle portion 22a is attached to the end of a tubular nozzle barrel portion 22b by a nozzle fixing cap 22c which is screwed in. To prevent paste leakage, a packing 22d is inserted inbetween the nozzle portion 22a and the nozzle barrel 22b. At another end of the nozzle barrel 22b, a head cover 22e is screwed into the nozzle barrel 22b. A piston 21 penetrates through the head cover 22e. O-ring 22f is inserted between the head cover 22e and the nozzle barrel 22b, and O-ring 22g is inserted between the piston 21 and the had cover 22e for paste sealing purposes. Between the nozzle barrel 22b and the piston 21, a fluid by-pass section 22h is provided.

According to the invention, the piston driving device 19 descends slowly by slowly rotating the drive shaft 16c via the differential gear 16b, thereby, regardless of paste configuration, the paste 26 is dispensed accurately. In addition, the time-lag between the air signal and the dispensing action due to the air's compressible nature is eliminated.

Another advantage of the present invention is the reduction of the wight of the piston driving device such that the vertical motion of the nozzle is sped up, and maintenance for the piston and nozzle are eased.

As many apparently widely different embodiments of the invention may be made without departing from the spirit and scope therein, it is to be understood that the invention is not limited to the specific embodiments herein except as defined in the appended claims.

We claim:

1. An apparatus for dispensing a predetermined volume of paste-like fluid, comprising:
   a nozzle holder,
   a nozzle attached to said holder for dispensing a paste-like fluid,
   a means for vertically driving said nozzle holder,
   a piston for forcing a paste-like fluid through said nozzle,
   a means for driving said piston; and
   an electrical means for synchronizing said piston driving means to said vertically driving means so that the motion of the nozzle holder is compensated by a motion of the piston.

2. An apparatus of claim 1 for dispensing a predetermined volume of paste-like fluid, wherein said piston driving device is attached to said nozzle holder.

3. An apparatus of claim 1 for dispensing a predetermined volume of paste-like fluid, further comprising a machine frame, wherein said piston driving device is attached to the machine frame.

4. An apparatus of claim 1 for dispensing a predetermined volume of paste-like fluid, wherein said piston driving device further comprises a spline mechanism.

5. An apparatus of claim 4 for dispensing a predetermined volume of paste-like fluid, wherein said piston driving means comprises a motor and a differential means, said differential means for differentiating an output of said motor to obtain a high speed reduction ratio of the motor output to an output of said differential means, wherein the output of said differential means drives the piston; and further comprising a machine frame, wherein said motor and said differential means are attached to said machine frame and said spline mechanism is attached to said nozzle holder.

6. An apparatus of claim 1 for dispensing a predetermined volume of paste-like fluid, wherein said piston driving means comprises a motor and a differential means, said differential means for differentiating an output of said motor to obtain a high speed reduction ratio of the motor output to an output of said differential means, wherein the output of said differential means drives the piston.

7. An apparatus for dispensing a predetermined volume of paste-like fluid as claimed in claim 6 wherein said differential means comprises a wave-generator, a flexspline, and a circular spline.

8. An apparatus for dispensing a predetermined volume of paste-like fluid, comprising:
   a nozzle holder,
   a nozzle attached to said holder for dispensing a paste-like fluid,
   a device for vertically driving said nozzle holder,
   a piston for forcing a paste-like fluid through said nozzle,
   a device for driving said piston comprising a motor and a differential means, said differential means for differentiating an output of said motor to obtain a high speed reduction ratio of the motor output to an output of said differential means, wherein the output of said differential means drives the piston;
   wherein said differential means comprises a female screw body connection to said piston and driven by a male screw shaft connected to said motor, a gear fixed to said male screw shaft, three successive transmission gears driven by the rotation of said male screw shaft which in turn drives said female screw body such that said female screw body is rotated and moved vertically along the male screw body, such vertical motion causing said female screw body to vertically move the piston connected to said female screw body and wherein a rotation ratio of male screw shaft rotation to female body rotation is approximately one.

9. An apparatus for dispensing a predetermined volume of paste-like fluid, comprising:
   a nozzle holder;
   a nozzle attached to said holder for dispensing a paste-like fluid;
   a means for vertically driving said nozzle holder; a piston for forcing a paste-like fluid through said nozzle;
   a means for driving said piston comprising a motor and a differential means, said differential means for differentiating an output of said motor to obtain a high speed reduction ratio of the motor output to an output of said differential means, wherein the output of said differential means drives the piston;
   a machine frame, wherein said piston driving means is attached to the machine frame;
   an electrical circuit for synchronizing the means for driving said piston to the means for vertically driving said nozzle holder so as the motion of the nozzle holder is compensated by a motion of the piston.

* * * * *